United States Patent [19]
Beagle et al.

[11] Patent Number: 6,120,189
[45] Date of Patent: Sep. 19, 2000

[54] MULTIPLE OFFSET JOURNAL BEARING WITH STEPPED DIAMETERS FOR EASE OF ASSEMBLY

[75] Inventors: Wayne P. Beagle, Chittenango; John F. Booker, Ithaca, both of N.Y.

[73] Assignee: Carrier Corporation, Syracuse, N.Y.

[21] Appl. No.: 09/293,344

[22] Filed: Apr. 16, 1999

[51] Int. Cl.[7] .................................................... F16C 33/04
[52] U.S. Cl. ............................ 384/429; 384/255; 384/294
[58] Field of Search .................................... 384/255, 288, 384/294, 295, 429, 430

[56] References Cited

U.S. PATENT DOCUMENTS

| | | | |
|---|---|---|---|
| 2,796,769 | 6/1957 | Gratzmuller | 384/294 X |
| 2,859,058 | 11/1958 | Traugott | 384/255 X |
| 5,112,145 | 5/1992 | MacGregor | 384/286 |

OTHER PUBLICATIONS

The American Society of Mechanical Engineers, (ASME) 81–Lub–34 —Journal of Lubricaton Technology —Transactions of the ASME, entitled Dynamic Analysis of Rocking Journal Bearings with Multiple Offset Segments (pp.1–10).

Primary Examiner—Thomas R. Hannon

[57] ABSTRACT

A wrist pin is provided with a plurality of offset cylindrical segments which are centered on one of two parallel axes. The segments are of reducing diameter in going from one end to the other and the reduction in diameter between segments is at least equal to their offset.

3 Claims, 2 Drawing Sheets

MULTIPLE OFFSET JOURNAL BEARING WITH STEPPED DIAMETERS FOR EASE OF ASSEMBLY

BACKGROUND OF THE INVENTION

In reciprocating compressors an eccentric of a crankshaft is received in a bearing located at one end of the connecting rod. The eccentric rotates within the bearing as the crankshaft rotates and the bearing orbits with respect to the axis of the crankshaft. The other end of the connecting rod is connected to a piston through a wrist pin. Although one end of the connecting rod is undergoing an orbiting motion, the other end is held to a pivoting and reciprocating motion since the piston can only reciprocate. The crankcase pressure always acts on one side of the piston and this pressure is normally suction pressure. The other side of the piston is acted on by a range of pressures which ranges from less than suction pressure for unstaged compressors, or less than intermediate pressure for staged compressors, in order to draw gas into the cylinders, to greater than discharge pressure to overcome the system pressure and valve bias acting to hold the discharge valve closed.

Where less than suction pressure is acting on one side of the piston during the suction stroke, there is a pressure/load reversal across the piston during each cycle. Where intermediate pressure is being drawn into the cylinder, however, the differential pressure across the piston is always in the same direction and there is no pressure/load reversal.

Conventional journal bearings develop extremely thin lubricant films and consequently high friction and wear under duty cycles which combine nonreversing loading with limited journal angular oscillation. Where the bearing load reverses, a thick-film hydrodynamic lubrication condition is maintained as the journal is squeezed back and forth within the sleeve, but where the load never reverses, thin-film "mixed" lubrication conditions develop as the journal is gradually squeezed against the sleeve. One approach to the problem is to modify the bearing surface(s) in such a way that journal oscillation, however limited, can be used to develop thick-film hydrodynamic lubrication. Load sharing between segments of a composite bearing having offset centerlines varies dynamically with rotation and translation of the journal in the sleeve. Thus, as the journal "rocks" back and forth, the load carried by each segment is relieved periodically even if the total load is not.

Where composite bearings having offset centerlines have been employed, it has been necessary to split the bearing for assembly. Accordingly, the use of multiple offset segments have been limited to relatively large journal bearing wrist pin designs to produce squeeze film lubrication in nonreverse loading applications. The relatively small size of wrist pin bearings used for refrigeration compressors, and the like, do not permit the use of split bearings in assembly. A major reason that split bearings cannot be used in refrigerant compressors, or the like, is that a diametrical wrist pin clearance on the order of 0.0005 inches cannot be maintained, upon assembly, although it is necessary to achieve proper lubrication.

SUMMARY OF THE INVENTION

The PRIOR ART multiple offset journal bearing wrist pin having stepped, equal diameter portions is modified by having successive bearing segments of decreasing diameter. The bearing segments are centered on one of two offset, parallel axes and the decrease in diameter between successive segments in at least equal to the offset.

It is an object of this invention to permit one piece assembly of journal bearing wrist pins.

It is another object of this invention to permit a wrist pin having offset segments to be assembled from one side of the piston, straight through, without interference. These objects, and others as will become apparent hereinafter, are accomplished by the present invention.

Basically a wrist pin is provided with a plurality of offset cylindrical segments which are centered on one of two parallel axes. The segments are of reducing diameter in going from one end to the other and the reduction in diameter between segments is at least equal to their offset.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Common to all embodiments, there are five segments of the wrist pin which correspond to segments of the piston and connecting rod. The wrist pin may have segments, or portions of segments, that only differ by one being located in the piston and the other in the connecting rod. The two outer segments are always located in the piston and the center segment is always located in the connecting rod. The segments located between the two end segments and the center segment may be located in either the piston or the connecting rod depending upon the location of bearing structure. Although the drawings are scaled to show the offsets and differences in diameter, offsets on the order of 0.001 to 0.002 inches and diameter reductions of 0.001 to 0.004 inches have been satisfactorily used.

Figure 1:
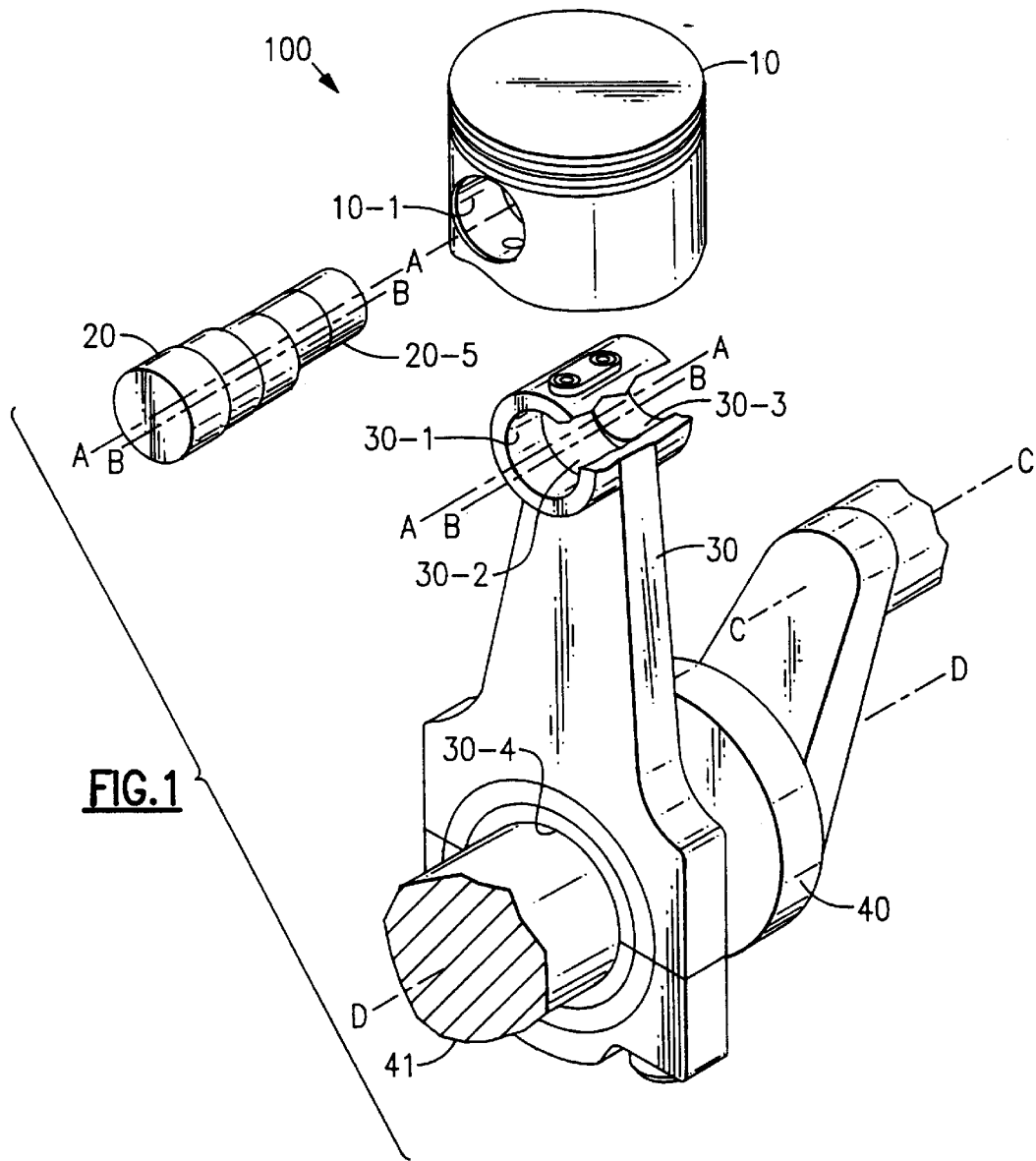
FIG. 1 is an exploded, partially cutaway, view of a piston and connecting rod assembled with a wrist pin employing the teachings of the present invention.
Figure 2:
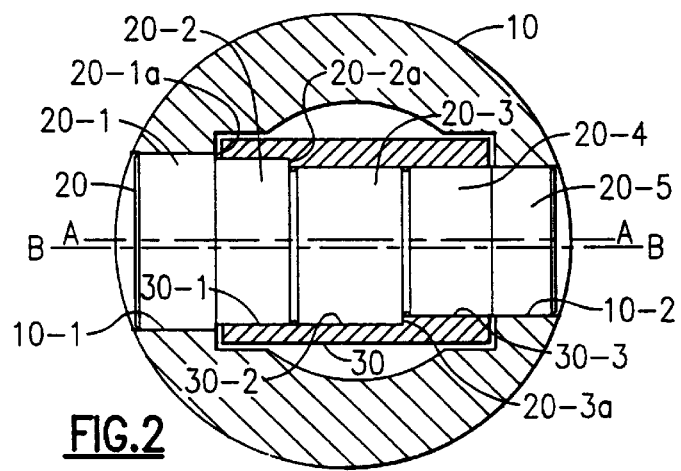
FIG. 2 is a partially sectioned view of the assembled piston and connecting rod of FIG. 1.

In FIG. 1, the numeral 100 generally designates a piston assembly made up of piston 10, wrist pin 20 and connecting rod 30. Bore 30-4 of connecting rod 30 receives crank 41 of crankshaft 40 and piston 10 reciprocates in a cylinder bore (not illustrated). As is clear from the FIGS. 1 and 2, wrist pin 20 is inserted into bore 10-1 of piston 10 with segment 20-5 then serially passing through bore segments 30-1, 30-2 and 30-3 in connecting rod 30 before being received in bore 10-2 of piston 10. Referring specifically to FIG. 2, wrist pin 20 is made of five segments. Segment 20-1 has the largest diameter and it is received in corresponding bore 10-1 of piston 10. Segment 20-2 is coaxial with segment 20-1 but it is smaller in diameter such that there is a shoulder 20-1a between segments 20-1 and 20-2. Segment 20-2 is received in corresponding bore 30-1 of connecting rod 30. Segment 20-3 is offset from segment 20-2 and is smaller in diameter such that there is a shoulder 20-2a between segments 20-2 and 20-3. Segment 20-3 is received in corresponding bore 30-2 of connecting rod 30. Segment 20-4 is offset from segment 20-3 and is coaxial with segments 20-1 and 20-2.

Segment 20-4 is smaller in diameter than segment 20-3 such that there is a shoulder 20-3a between segments 20-3 and 20-4. Segment 20-4 is received in corresponding bore 30-3 of connecting rod 30. Segment 20-5 is an extension of segment 20-4 and is coaxial therewith and of the same diameter. Segment 20-5 is received in corresponding bore 10-2 in piston 10.

In assembling piston assembly 100, segment 20-5 of wrist pin 20 is press fit into bore 10-2 of piston 10 and segment 20-1 of wrist pin 20 is press fit into bore 10-1 of piston 10. Accordingly, wrist pin 20 is fixed with respect to piston 10. As between piston 10, wrist pin 20 and connecting rod 30, all relative movement is by connecting rod 30 with respect to piston 10 and wrist pin 20 which are fixed relative to each other. As noted above, segments 20-2, 20-3 and 20-4 of wrist pin 20 are respectively received in bores 30-1, 30-2 and 30-3 of connecting rod 30. Segments 20-2 and 20-4 and bores 30-1 and 30-3 are coaxial and segment 20-3 and corresponding bore 30-2 are coaxial but there axis, B—B, is offset from the axis, A—A, of segments 20-2 and 20-4 and bores 30-1 and 30-3. The plane defined by axes A—A and B—B would be, nominally, perpendicular to the axes of symmetry of connecting rod 30.

As crankshaft 40 rotates about its axis C—C, eccentric crank 41 rotates in bore 30-4 of connecting rod 30. The portion of connecting rod 30 surrounding and defining bore 30-4, which has an axis, D—D, orbits with respect to axis C—C of crankshaft 40. The portion of connecting rod 30 defining bores 30-1, 30-2 and 30-3 must undergo a combination of reciprocating rocking/rotary movement to permit the movement of crank 41 in bore 30-4. Because axis B—B of segment 20-3 and bore 30-2 is offset from axis A—A of segments 20-2 and 20-4 and their corresponding bores 30-1 and 30-3, there is a shift in support between bores 30-1 and 30-3 and bore 30-2, all of which function as bearings with respect to wrist pin 20. The cyclic shifting of some of the load between bores 30-1 and 30-3 and bore 30-2 as crankshaft 40 rotates permits the maintaining of a oil film in the bearings defined by bores 30-1, 30-2 and 30-3.

Figure 3:
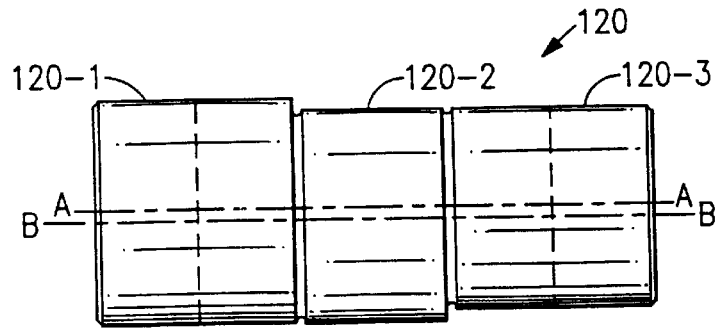
FIG. 3 is a top view of a modified wrist pin.

Referring now to FIG. 3 wrist pin 120 differs from wrist pin 20 in that it is intended to be secured in place in the piston with set screws rather than being press fit. Wrist pin 120 has three segments. The first segment, 120-1 corresponds to both segments 20-1 and 20-2 in that it is received in the piston as well as in bore 30-1 of connecting rod 30. Segment 120-2 directly corresponds to segment 20-3 and is received in bore 30-2 of connecting rod 30. Segment 120-3 corresponds to both segments 20-4 and 20-5 with segment 120-3 being received both in bore 30-3 of connecting rod 30 and in the piston. Except for the method of securing wrist pin 120 in the piston it functions the same as wrist pin 20 as described above.

Figure 4:
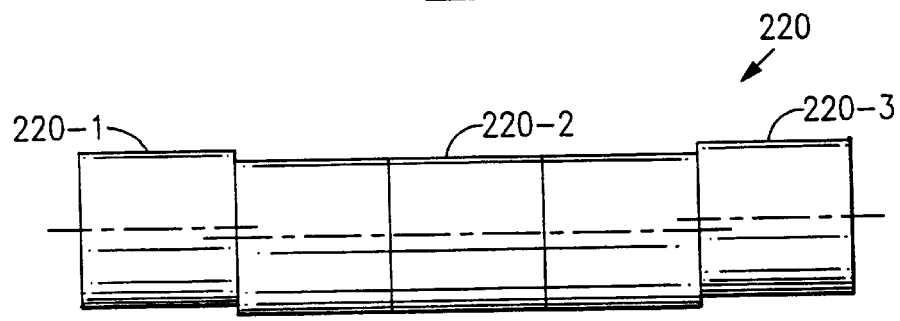
FIG. 4 is a top view of a PRIOR ART wrist pin.

Referring to FIG. 4, wrist pin 220 represents a PRIOR ART wrist pin where the bearing structure is in the piston rather than in the connecting rod, as is the case for wrist pins 20 and 120. Segments 220-1, 220-2 and 220-3 are of the same diameter with segment 220-2 being offset from segments 220-1 and 220-3 which are coaxial. Segments 220-1 and 220-3 are received in corresponding bores in a piston. Segment 220-2 is received in corresponding bores in the piston as well as in the connecting rod. The connecting rod is fixed to the wrist pin 220 and moves therewith as a unit. The wrist pin 220 has a rocking/rotary movement with respect to the piston. Because offset wrist pin segments are received in corresponding offset bores in the piston there is a load shifting between the bearing segments as the crankshaft drives the connecting rod. Because segments 220-1, 220-2 and 220-3 are of the same diameter and segment 220-2 is offset from segments 220-1 and 220-3, the piston must be split to permit assembly.

Figure 5:
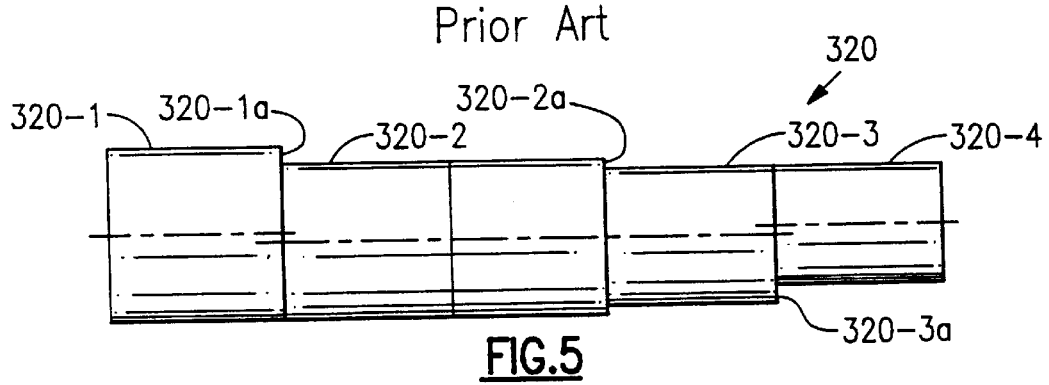
FIG. 5 is a top view of a second modified wrist pin.
Figure 6:
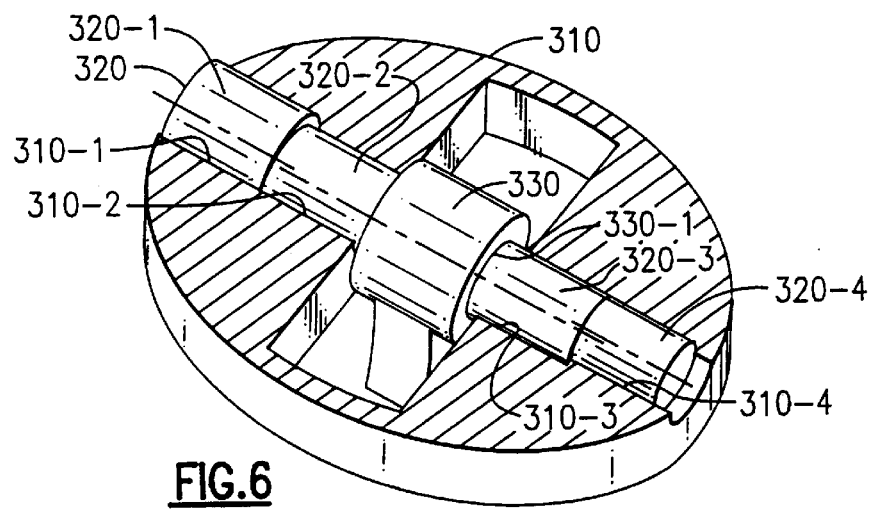
FIG. 6 is a partially sectioned view of a piston assembly employing the wrist pin of FIG. 5.

Referring now to FIGS. 5 and 6, wrist pin 320 corresponds to PRIOR ART wrist pin 220 modified in view of the teachings of the present invention. Wrist pin 320 is made up of four segments. Segment 320-1 has the largest diameter and is received in coaxial bore 310-1 of piston 310 which functions as a bearing with respect to segment 320-1. Segment 320-2 is offset from segment 320-1 and a portion is received in coaxial bore 310-2 in piston 310 and bore 310-2 functions as a bearing with respect to segment 320-2. Segment 320-2 is smaller in diameter than segment 320-1 so that there is a shoulder 320-1a between segments 320-1 and 320-2. Another portion of segment 320-2 is received in bore 330-1 of connecting rod 330 in a press fit such that, in operation, connecting rod 330 and wrist pin 320 move as a unit. Segment 320-3 is coaxial with segment 320-2 and is received in coaxial bore 310-3 in piston 310 and bore 310-3 functions as a bearing with respect to segment 320-3. Segment 320-3 is smaller in diameter than segment 320-2 so that there is a shoulder 320-2a between segments 320-2 and 320-3. Segment 320-4 is offset from segment 320-3 and is coaxial with segment 320-1. Segment 320-4 is received in coaxial bore 310-4 in piston 310 and bore 310-4 functions as a bearing with respect to segment 320-4. Segment 320-4 is smaller in diameter than segment 320-3 so that there is a shoulder 320-3a between segments 320-3 and 320-4.

In operation, the rocking/rotary movement of connecting rod 330 and wrist pin 320, as a unit due to their press fit connection, shifts the bearing load between segments 320-1 and 320-4 supported by bores 310-1 and 310-4, respectively, and segments 320-2 and 320-3 supported by bores 310-2 and 310-3. It is not necessary that the entire load be supported by one set of bearings as the cyclic reduced loading of the bearings is sufficient to maintain the required oil film.

Although preferred embodiments of the present invention have been illustrated and described, other changes will occur to those skilled in the art. It is therefore intended that the scope of the present invention is to be limited only by the scope of the appended claims.

What is claimed is:

1. A journal bearing comprising:

a wrist pin having a plurality of segments with each end segment being coaxial and with a central segment being offset from said end segments;

a first one of said end segments, said central segment and a second one of said end segments being of successively smaller diameters;

a piston having first and second axially spaced, coaxial bores with said first bore being of a diameter corresponding to said first one of said end segments and said second bore being of a diameter corresponding to said second one of said end segments;

a connecting rod having a bore corresponding to said intermediate segment;

said wrist pin, piston and connecting rod being assembled such that said first end segment of said wrist pin is in said first bore of said piston, said central segment of said wrist pin being located in said bore of said connecting rod, said second end segment of said wrist pin being located in said second bore of said piston;

a first intermediate bore located in one of said piston and said connecting rod intermediate and offset with respect to only one of said first bore in said piston and said bore in said connecting rod and of a diameter no larger than that of said first bore in said piston;

a second intermediate bore located in one of said piston and said connecting rod intermediate and offset with respect to only one of said bore in said connecting rod and said second bore in said piston and of a diameter no larger than that of said bore in said connecting rod;

said wrist pin further having a first intermediate segment receivable in and of a corresponding diameter to said first intermediate bore, and having a second intermediate segment receivable in and of a corresponding diameter to said second intermediate bore;

said wrist pin being fixed with respect to one of said piston and connecting rod whereby upon rotary movement of said connecting rod with respect to said bore in said connecting rod alternates loading between said wrist pin and said first and second intermediate bores and any one of said bores offset with respect to said first and second intermediate bores.

2. The journal bearing of claim 1 wherein said first and second intermediate bores are located in said piston and said wrist pin is fixed with respect to said connecting rod.

3. The journal bearing of claim 1 wherein said first and second intermediate bores are located in said connecting rod and said wrist pin is fixed with respect to said piston.

* * * * *